(12) United States Patent
Kadishay

(10) Patent No.: US 9,329,978 B2
(45) Date of Patent: May 3, 2016

(54) SOFTWARE UNIT TEST IMMUNITY INDEX

(71) Applicant: Yotam Kadishay, Adanim (IL)

(72) Inventor: Yotam Kadishay, Adanim (IL)

(73) Assignee: SAP Portals Israel Ltd, Ra'anana (IL)

( * ) Notice: Subject to any disclaimer, the term of this patent is extended or adjusted under 35 U.S.C. 154(b) by 151 days.

(21) Appl. No.: 13/971,001

(22) Filed: Aug. 20, 2013

(65) Prior Publication Data

US 2015/0058675 A1 Feb. 26, 2015

(51) Int. Cl.
*G06F 11/36* (2006.01)

(52) U.S. Cl.
CPC .......... *G06F 11/368* (2013.01); *G06F 11/3676* (2013.01)

(58) Field of Classification Search
None
See application file for complete search history.

(56) References Cited

U.S. PATENT DOCUMENTS

| 7,539,977 B1* | 5/2009 | Bloom .......................... 717/124 |
| 2014/0123110 A1* | 5/2014 | Wan et al. ..................... 717/124 |

OTHER PUBLICATIONS

U.S. Appl. No. 13/740,858, Eyal Nathan et al., filed Jan. 14, 2013.
U.S. Appl. No. 13/740,603, Yatam Kadishay et al., filed Jan. 14, 2013.
U.S. Appl. No. 13/760,573, Yotam Kadishay, filed Feb. 6, 2013.

* cited by examiner

*Primary Examiner* — Jared Rutz
*Assistant Examiner* — Christopher Do
(74) *Attorney, Agent, or Firm* — Fish & Richardson P.C.

(57) ABSTRACT

The present disclosure describes methods, systems, and computer program products for measuring strength of a unit test. One computer-implemented method includes receiving software unit source code associated with a unit test, analyzing a line of the software unit source code for removability, initiating, by operation of a computer, modification of the software unit source code to remove the line of the software unit source code and create a modified software unit, initiating execution of the modified software unit using the unit test, determining success or failure of a unit test execution, and analyzing a next line of the software unit source code for removability.

18 Claims, 2 Drawing Sheets

SOFTWARE UNIT TEST IMMUNITY INDEX

BACKGROUND

Unit testing is a method in which individual units of source code, for example computer program modules such as functions, procedures, and methods, together with associated control data, usage procedures, and operating procedures, are tested to determine if the units of source code meet design requirements and can be approved for use. Unit testing typically uses code coverage measurements to quantify the quality of unit tests. Code coverage is a measurement used to describe a degree to which source code of a software program is tested by a particular unit test of a test suite. A software program with high code coverage ratio can be considered to have been more thoroughly tested and has a lower chance of containing software bugs than a program with a low code coverage ratio. Many different metrics can be used to calculate code coverage; some of the most basic are the percent of program units and the percent of program statements per program unit called during execution of the test suite. However, code coverage measurements do not provide any additional measurements regarding the quality of the unit test. Even if a unit test has a high code coverage ratio, the unit test can still be a poor indicator of the unit test quality. With poor quality unit tests, tested software units may be released with incorrect and/or inefficient functionality, the software incorporating the software units may create user dissatisfaction, and incorrect functionality/maintenance requirements can result in an increased total cost of ownership for the software.

SUMMARY

The present disclosure relates to computer-implemented methods, computer-readable media, and computer systems for measuring strength of a unit test. One computer-implemented method includes receiving software unit source code associated with a unit test, analyzing a line of the software unit source code for removability, initiating, by operation of a computer, modification of the software unit source code to remove the line of the software unit source code and create a modified software unit, initiating execution of the modified software unit using the unit test, determining success or failure of a unit test execution, and analyzing a next line of the software unit source code for removability.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising determining whether there are remaining lines of software unit source code for analysis.

A second aspect, combinable with any of the previous aspects, further comprising generating a unit test immunity index value as a ratio of unit test execution failures to a total number of unit test executions.

A third aspect, combinable with any of the previous aspects, further comprising determining whether the line of the software unit source code can be removed.

A fourth aspect, combinable with any of the previous aspects, further comprising modifying the software unit source code to remove the line of the software unit source code.

A fifth aspect, combinable with any of the previous aspects, further comprising recording the determined success or failure of the unit test execution.

A sixth aspect, combinable with any of the previous aspects, further comprising initiating reversal of the modification of the software unit source code.

The subject matter described in this specification can be implemented in particular implementations so as to realize one or more of the following advantages. First, a new measurement (immunity index) for the strength of a unit test is introduced. By repeatedly removing a single line of code per software unit iteration, a unit test failure/total executions ratio is generated indicating the overall strength of the unit test. Second, the immunity index value can be used to identify weak unit tests and to improve unit testing. Improved unit testing can reduce the release of software bugs and increase overall functionality and value of software by, among other things, reducing customer dissatisfaction and maintenance costs due to software bugs. Third, files, functions, and/or units can be identified which are not tested thoroughly to improve testing. Fourth, redundant tests can be spotted. Redundant tests may have high coverage but a very low immunity index, meaning that code may likely have been tested in a non-relevant/weak manner. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
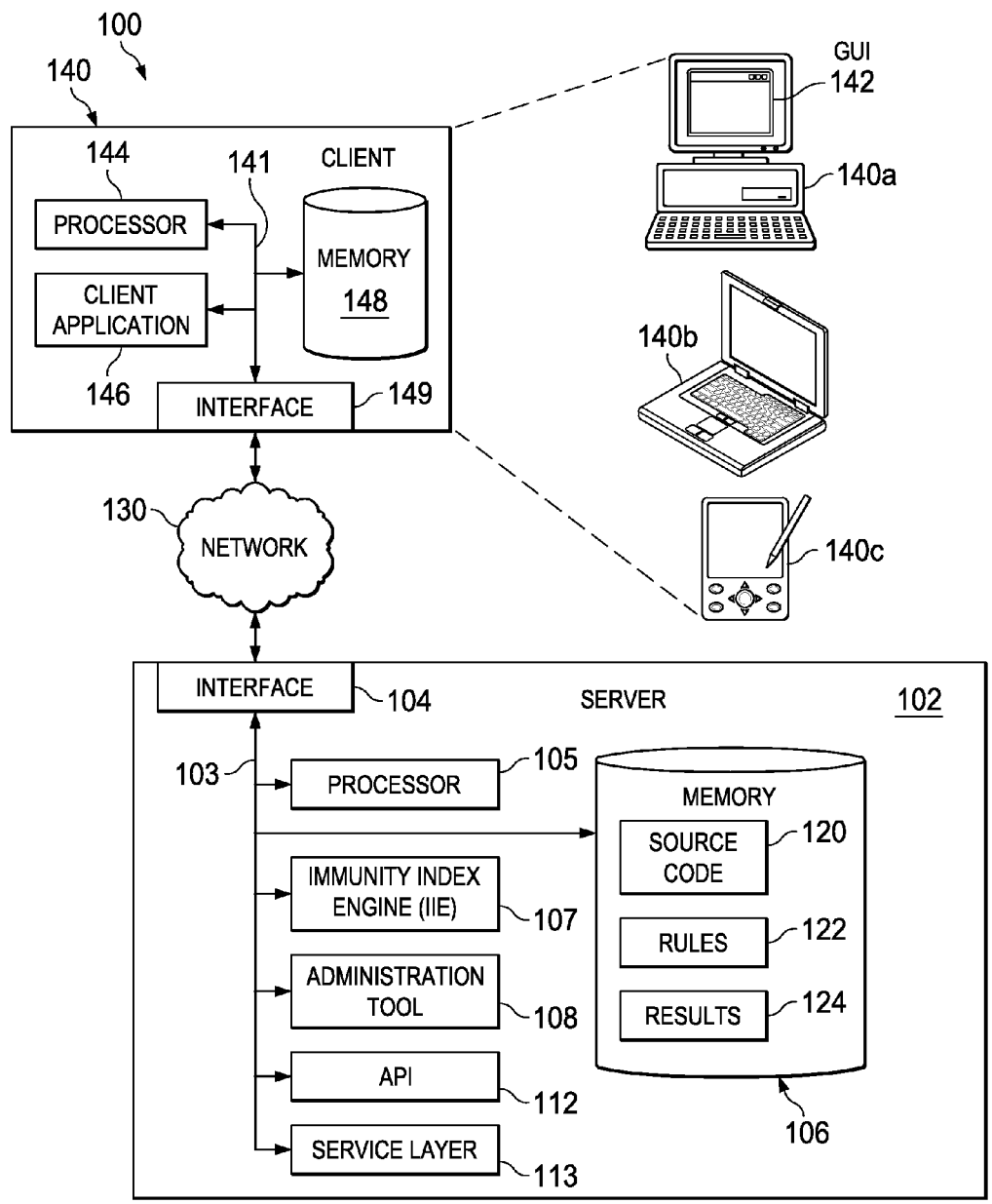
FIG. 1 is a block diagram illustrating an example distributed computing system for measuring strength of a unit test according to an implementation.

This disclosure generally describes computer-implemented methods, computer-program products, and systems for measuring strength of a unit test. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Unit Testing

Unit testing is a method in which individual units of source code, for example computer program modules such as functions, procedures, and methods, together with associated control data, usage procedures, and operating procedures, are tested to determine if the units of source code meet design requirements and can be approved for use. Unit testing typically uses code coverage measurements to quantify the quality of unit tests. Code coverage is a measurement used to describe a degree to which source code of a software program is tested by a particular unit test of a test suite. A software program with high code coverage ratio can be considered to have been more thoroughly tested and has a lower chance of containing software bugs than a program with a low code coverage ratio. Many different metrics can be used to calculate code coverage; some of the most basic are the percent of program units and the percent of program statements per program unit called during execution of the test suite. However, code coverage measurements do not provide any additional measurements regarding the quality of the software unit under unit test. Even if a unit test has a high code coverage ratio, unit test results can be a poor indicator of the software unit quality as a unit test developer can create unit tests which execute the software unit code in order to meet strict unit test requirements, but yet fail to verify that the software unit fulfills its intended purpose(s). For example, a unit test developer can run a function X with some arbitrary input Y but ignore the value of the function X output Z. Here the software unit was "executed" and high code coverage is reported, but apart from that the test results are meaningless. With poor quality unit tests, tested software units may be released with incorrect and/or inefficient functionality, the software incorporating the software units may create user dissatisfaction, and incorrect functionality/maintenance requirements can result in an increased total cost of ownership for the software.

Unit Test Immunity Index

The unit test immunity index (UTII) is a measurement of unit test strength, which is determined by repeatedly executing a unit test on a software unit and omitting a single line of source code (if possible) from software unit for each execution. A success/failure result is recorded for each execution of the software unit and a cumulative overall failure/total executions ratio is calculated to indicate the strength of the unit test. In some implementations, the ratio can be calculated using the overall number of successes/total executions or a combination of success/failure to total executions.

Some source code lines are not omitted as an omission is seen as highly likely to cause the execution of the code to fail (e.g., compilation, assembly, and/or interpretation) or will be redundant to the tests. For example, in some implementations, source code lines that contain the following will not be omitted as part of the UTII testing process and will simply be skipped:

1) Function declarations
2) Variable declarations (depending upon specific coding language)
3) Conditional statements (e.g. IF, ELSE, etc.)
4) Loop declarations (e.g. FOR, WHILE, etc.)
5) Opening source code sections without a closing in a same source code line (same for a closing) (e.g. "{", "(", "}", ")")
6) Function RETURN statements
7) Empty source code lines
8) Comment lines.

If an example source code line as described above were omitted, it is likely that the code will not compile/function or function in an unexpected manner and a test will probably fail. In some implementations, rules determine which source code lines are skipped and under what conditions. For example, data pertaining to 1)-8) above can be indicated in the rules to cause a source code line to be skipped. When a source code line is skipped, the intact source code is not executed again using an associated unit test as this serves no useful purpose for the calculation of the UTII value. If a source code line is skipped, the next source code line is then checked.

In general, when executing a received software unit under unit test, each source code line X of the software unit will be analyzed to determine whether it can be omitted. If it is determined that the source code line X can be omitted, it is omitted and the software unit is run with the omitted source code line X under a unit test. A success/failure result for the unit test is saved. The omitted source code line X is replaced in the software unit source code and the next source code line X+1 analyzed to determine whether it can be omitted. If source code line X+1 can be omitted, it is removed and the test executed again, otherwise source code line X+2 is analyzed. This process runs until all source code lines have been analyzed and the software unit executed under the unit test where a source code line was removed. In other words, the unit test is typically executed as many times as it was determined that a source code line could be removed from the software unit. An overall failure/total executions ratio is returned as a UTII value. Here, more failures indicate that the removed source code lines are essential for proper testing of the software unit and that source code lines that were removed affected the outcome of the software unit in that their removal changed the outcome to an extent that the test failed—in other words the tests have tested the source code lines on the outcome of the software unit. The UTII in this case indicates that the unit test is stronger in that the unit test at least executed essential lines of source code. In addition, knowing that a source code line is essential for proper testing helps a software tester to understand that the logic in an essential source code line influences the outcome of the unit test and that the unit test could further focus on testing the logic pertaining to the omitted source code lines that resulted in a failure result (e.g., test various conditions and values, boundary conditions, improper input, etc.).

In a first example, a software developer has written a function which creates a person object. The function receives person detail as input—containing a person's first name, last name, weight and height) and outputs a person object (which contains the person's first and last name and a calculated body mass index (BMI)).

Example software unit source code could include:

```
function createPerson(detail) {
    var person = { };
    person.firstName = detail.fName;
    person.lastName = detail.lName;
    person.bmi = getBMI(detail.weight, detail.height);
    return person;
};
function getBMI(w, h) {
    var bmi = w * 10000;
    bmi = bmi / (h * h);
    return bmi;
};
```

For example purposes, assume that the software developer is testing the following:

1) The person first name
2) The person BMI is larger than 10

An example unit test written in a JASMINE testing framework and satisfying this testing criteria might include:

```
describe("A test suite", function( ) {
    it("testing the code", function( ) {
        var detail = {
            fName : "fName",
            lName : "lName",
            weight : 80,
            height : 180
        };
        var person = createPerson(detail);
        expect(person.fName).toBe(detail.fName); //testing first name
        expect(person.bmi).toBeGreaterThan(10); //testing bmi
    });
});
```

Here, the exemplary unit test has covered 100% of the source code lines (14 of 14) and therefore has 100% code coverage. Nevertheless, the unit test is very basic, and fails to adequately exercise the software unit's logic—the unit test is very weak.

In calculating a UTII for this unit test, the unit test will be executed 4 times; each execution will omit one of the following software unit source code lines: 3, 4, 5, and 11. Note that these lines are not skipped due to the rules described above. When omitting line 3 (person.firstName=detail.fName;) or 5 (person.bmi=getBMI(detail.weight, detail.height);) the test will fail (no firstName value is set and the BMI value is not set, respectively), and when omitting line 4 (person.lastName=detail.lName;) or 11 (bmi=bmi/(h*h);) the test will succeed (for the given testing criteria, omitting lines 4 and 11 did not cause the test to fail). Therefore the UTII value is calculated as a failure/total executions ratio to be 50%. The 50% is based on 2 failures/4 total unit test executions=50%. The UTII provides a value to describe the strength of the unit test more correctly than a general code coverage value of 100%.

In a second example, given the following functions:

```
function A(input) {
    var output = input;
    if (input > 5) {
        output = output + 1;
    } else {
        output = output − 1;
    }
    return output
}
function B(input) {
    return (input > 5) ? (input + 1) : (input − 1);
}
function C(input) {
    if (input > 5) {
        return (input + 1);
    } else {
        return (input − 1);
    }
}
function D(input) {
    if (input > 5) {
        input = input + 1;
    } else {
        input = input − 1;
    }
    return (input)
}
```

It should be clear that each function A, B, C, and D performs the following logic (although each is written in differently formatted source code):

1) If a number is >5 add 1 to the number
2) Else if the number <=5 subtract 1 from the number If the input values of 3 and 6 are input to either function A, B, C, or D, a 100% code coverage ratio is reported for each function, but, for example, only verification that the output is >0 is tested.

The UTII value for each test, however, is somewhat more instructive as to the strength of the unit test. For example, the following are UTII values for each function:

1) Function A—0% (lines 4 and 6 can be omitted)
2) Function B—100% (no lines can be omitted)
3) Function C—100% (no lines can be omitted)
4) Function D—0% (lines 3 and 5 can be omitted)

These values provide an indication of the unit test weakness. For example, functions A and D returned a UTII of 0%, indicating a weak unit test as no failures occurred in the execution of the unit test. A software tester might take the UTII value results and work on updating the unit test to better exercise the logic of Functions A and D (or possibly have the logic re-engineered to allow better testing with unit tests). For example, for functions A and D, the expectation is simply that a result is greater than zero and not a more precise result of say +/−1 from an input value. As a result, calculation source code that can be omitted allows the tests to still succeed. Improving the functions would be to have logic to, for example, return 2 with an input of 3 or return 7 with an input of 6. Additionally, although the UTII value (100%) for functions B and C appear to indicate a strong unit test; further examination reveals that no lines could be omitted in either function. As such, the UTII values for functions B and C fail to provide a useful indication for the unit test strength (in fact here, the UTII value is equivalent to the code coverage result of 100%) and particular attention should be paid to the exercise of the logic in functions B and C with the unit test. A more useful test result would be to output something similar to "no source code lines were removed" instead of the non-useful 100% for functions B and C.

The following described computer-implemented methods, computer-readable media, and computer systems provide, among other things, functionality for measuring strength of a unit test as described above.

FIG. 1 is a block diagram illustrating an example distributed computing system (EDCS) 100 for measuring strength of a unit test according to an implementation. The illustrated EDCS 100 includes or is communicably coupled with a server 102 and a client 140 that communicate across a network 130. In some implementations, one or more components of the EDCS 100 may be configured to operate within a cloud-computing-based environment.

At a high level, the server 102 is an electronic computing device operable to receive, transmit, process, store, or manage data and information associated with the EDCS 100. According to some implementations, the server 102 may also include or be communicably coupled with an e-mail server, a web server, a caching server, a streaming data server, a business intelligence (BI) server, and/or other server.

In general, the server 102 is a server that provides at least software testing capability associated with an immunity index engine (IIE) 107 and/or an administration tool 108. The server 102 is responsible for receiving, among other things, unit test requests from network 130 from one or more client applications 146 associated with the client 140 of the EDCS 100 and responding to the received requests by processing the said requests at least in the IIE 107 and/or the administration tool 108. In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the IIE 107 and/or the administration tool 108.

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required to measure strength of a unit test and/or associated administrative functionality related to the measurement functionality.

The server 102 also includes a memory 106 that holds data for the server 102, client 140, and/or other components of the EDCS 100. Although illustrated as a single memory 106 in FIG. 1, two or more memories may be used according to particular needs, desires, or particular implementations of the EDCS 100. While memory 106 is illustrated as an integral component of the server 102, in alternative implementations, memory 106 can be external to the server 102 and/or the EDCS 100. In some implementations, memory 106 can be configured to store one or more instances of source code 120, rules 122 and/or results 124.

The source code 120 includes human-readable instructions in a software programming language, for example JAVA, C/C++, C#, and other programming languages. The source code 120 is transformed into computer instructions by a compiler, assembler or other translator, or carried out directly by an interpreter.

Although illustrated as integral to the server 102, in some implementations, the source code 120 can be wholly or partially stored remotely from the server 102 as long as the source code 120 is accessible by the server 102. The source code 120 may be accessed, for example, using a web service, a remote access system or software, a local or remote client 140, or other component of the EDCS 100. In some implementations, access to the source code 120 can be restricted by security policies and/or procedures (e.g., based on a user role, location, password login, etc.).

In some implementations, source code 120 can include intermediate steps of human-readable instruction compilation, assembly, and/or interpretation which can be modified by the IIE to remove functionality provided by a line of human-readable instructions. In these implementations, the IIE can monitor compilation, assembly, and/or interpretation of human-readable instructions to determine how to modify the intermediate steps.

The rules 122 may represent policies, conditions, parameters, variables, algorithms, instructions, constraints, references, and any other appropriate information used by the IIE 107 to determine success/failure of a unit test and to generate a UTII value based upon one or more results 124. In some implementations, the rules 122 can be generated/modified by the IIE 107 and/or the administration tool 108.

Although shown as integral to the memory 106, in some implementations, the rules 122 can be wholly or partially stored remotely from the server 102 as long as the rules 122 are accessible by the server 102. In these implementations, the rules 122 can be accessed, for example, using a web service, a remote access system or software, a local or remote client 140, or other suitable system component. In some implementations, the rules 122 can be wholly or partially stored in the IIE 107. In the implementations, changes to the rules 122 can, in some instances, require a restructuring, recompilation, etc. of the IIE 107. In some implementations, access to the rules 122 can be restricted by security policies and/or procedures (e.g., based on a user role, location, password login, etc.), particularly with respect to modification of the rules 122 using the administration tool 108 and/or appropriate other functionality.

The rules 122 can be represented by any type of suitable data structure in any suitable format. For example, the rules 122 could be an executable module, spreadsheet, database, flat file, binary file, multi-part file, linked list, and/or the like. The rules 122 can be generated, stored, and/or converted from/into any suitable format or form. In some implementations, multiple instances of rules 122 can be used to provide segregation of the particular rules 122 types. In some implementations, the rules 122 can act as a reference to an internal and/or external storage location, and/or provide functionality to interface with and/or retrieve one or more rules 122. In some implementations, a separate data structure (not illustrated) can be used, for example by the IIE 107 or the administration tool 108, as a reference to the data stored within a particular instance of rules 122.

The results 124 includes data indicating success/failure of particular unit tests. In some implementations, the results 124 can also include data such as unit test name, particular data about the source code (e.g., number of lines, removable lines, etc.), execution time/date, total number of executions, an overall UTII value for each unit test based on the success/failure data and the total executions of the unit test, and the like. In some implementations, the results 124 can be used for historical purposes. For example, unit test results associate with a particular software unit can be analyzed over the development cycle to determine whether unit tests became more efficient, etc.

Although shown as integral to the memory 106, in some implementations, the results 124 can be wholly or partially stored remotely from the server 102 as long as the results 124 are accessible by the server 102. In these implementations, the results 124 can be accessed, for example, using a web service, a remote access system or software, a local or remote client 140, or other suitable system component. In some implementations, the results 124 can be wholly or partially stored in the IIE 107. In some implementations, access to the results 124 can be restricted by security policies and/or procedures (e.g., based on a user role, location, password login, etc.).

The results 124 can be represented by any type of suitable data structure in any suitable format. For example, the results 124 could be an executable module, spreadsheet, database, flat file, binary file, multi-part file, linked list, and/or the like. The results 124 can be generated, stored, and/or converted from/into any suitable format or form. In some implementations, multiple instances of results 124 can be used to provide segregation of the particular types of rules 122. In some implementations, the results 124 can act as a reference to an internal and/or external storage location, and/or provide functionality to interface with and/or retrieve one or more results 124. In some implementations, a separate data structure (not illustrated) can be used, for example by the IIE 107 or the administration tool 108, as a reference to the data stored within a particular instance of results 124.

The immunity index engine (IIE) 107 is an algorithmic software engine providing functionality for measuring strength of a unit test. The IIE 107 can, using rules 122, analyze and determine whether a line can be removed from the source code 120 associated with a software unit prior to execution and initiate modification of the software unit source code 120 if a determination is made that the source code line can be removed. Initiating modification is meant to encompass either the IIE 107 removing the line of source code 120 from the software unit or the passing of instructions from the IIE 107 to one or more appropriate components of the EDCS 100 (whether illustrated or not) to perform this function. The IIE 107 can also initiate execution of the modified software unit source code 120, determine whether the modified software unit executed successfully or failed (success/failure) and record the success/failure value. Initiating execution is meant to encompass either the IIE 107 executing the modified software unit or the passing of instructions from the IIE 107 to one or more appropriate components of the EDCS 100 (whether illustrated or not) to perform this function. Note that initiating execution may encompass any appropriate step necessary to compile, assemble, interpret, and/or other appropriate task associated with the modified software unit source code 120. The IIE 107 can also initiate reversal of the modification made to the software unit source code. Initiating reversal of the modification is meant to encompass either the IIE 107 replacing the line of source code 120 in the software unit and/or the passing of instructions from the IIE 107 to one or more appropriate components of the EDCS 100 (whether illustrated or not) to perform this function. The IIE 107 can also generate an overall UTII value for the unit test based upon the results 124.

In some implementations, the IIE 107 can operate in conjunction with the administration tool 108 to provide administrative functionality to a client 140 associated with the above-described functions/tasks necessary to measure strength of a unit test (e.g., analyze a line of a software unit, initiate modification of software unit source code, etc.). The IIE 107 may also perform other suitable calculations, determinations, analysis, and/or functions consistent with the scope of this disclosure, including creation, edit, and deletion of source code 120, rules 122, and/or results 124; creating, editing, and deleting unit tests; reporting unit test results and/or an overall immunity index value; and/or generation of a GUI for use by a client 140/server 102 for above-described functionality. Further, although illustrated as a single IIE 107, the IIE 107 may be implemented as multiple IIE's 107 on the server 102. In addition, although illustrated as integral to the server 102, in alternative implementations, the IIE 107 can be external to the database server 102 and/or the EDCS 100 (e.g., wholly or partially executing on the client 140, other server 102 (not illustrated), etc.).

Once a particular IIE 107 is launched, the particular IIE 107 can be used, for example by a client 140 or other component of the EDCS 100 to interactively process a task, event, or other information/content associated with the server 102. In some implementations, the IIE 107 may be a network-based, web-based, and/or other suitable application consistent with this disclosure. For example, a particular IIE 107 may receive a unit test execution request from a client 140 browser. The IIE 107 can initiate execution of the unit test on the received unit test execution request and send an immunity index value associated with the unit test back to the requesting client 140.

In some implementations, a particular IIE 107 may operate in response to and in connection with at least one request received from other IIEs 107, other components (e.g., software and/or hardware modules) associated with another server 102, and/or other components of the EDCS 100 (whether illustrated or not). In some implementations, the IIE 107 can be accessed and executed in a cloud-based computing environment using the network 130. In some implementations, a portion of a particular IIE 107 may be a web service associated with the IIE 107 that is remotely called, while another portion of the IIE 107 may be an interface object or agent bundled for processing at a remote client 140. Moreover, any or all of a particular IIE 107 may be a child or sub-module of another software module or application (not illustrated) without departing from the scope of this disclosure. Still further, portions of the particular IIE 107 may be executed or accessed by a user working directly at the server 102, as well as remotely at a corresponding client 140. In some implementations, the server 102 or any suitable component of server 102 or the EDCS 100 can execute the IIE 107.

The administration tool 108 can provide, either alone or in conjunction with another application (e.g., the IIE 107, software test application (not illustrated), or other component of the EDCS 107 (whether illustrated or not)), functionality necessary to measure strength of a unit test. Provided functionality can include, among other things, creation, edit, and deletion of source code 120, rules 122, and/or results 124; creating, editing, and deleting unit tests; reporting unit test results and/or an overall immunity index value; generation of a GUI for use by a client 140/server 102 for above-described functionality; and/or any functionality consistent with this disclosure. Although illustrated as integral to the server 102, in alternative implementations, the administrative tool 108 can be external to the database server 102 and/or the EDCS 100 (e.g., executing wholly or partially on the client 140, other server 102 (not illustrated), etc.).

Once a particular administrative tool 108 is launched, the particular administrative tool 108 can be used, for example by a client 140 or other component of the EDCS 100 to interactively process a task, event, or other information/content associated with the server 102. In some implementations, the administrative tool 108 may be a network-based, web-based, and/or other suitable application consistent with this disclosure. For example, a particular administrative tool 108 may receive an administration request from a client 140 browser. The administrative tool 108 can initiate an administrative process based on the received administration request and send administrative data back to the requesting client 140.

In some implementations, a particular administrative tool 108 may operate in response to and in connection with at least one request received from other administrative tool 108, other components (e.g., software and/or hardware modules) associated with another server 102, and/or other components of the EDCS 100 (whether illustrated or not). In some implementations, the administrative tool 108 can be accessed and executed in a cloud-based computing environment using the network 130. In some implementations, a portion of a particular administrative tool 108 may be a web service associated with the administrative tool 108 that is remotely called, while another portion of the administrative tool 108 may be an interface object or agent bundled for processing at a remote client 140. Moreover, any or all of a particular administrative tool 108 may be a child or sub-module of another software module or application (not illustrated) without departing from the scope of this disclosure. Still further, portions of the particular administrative tool 108 may be executed or accessed by a user working directly at the server 102, as well as remotely at a corresponding client 140. In some implementations, the server 102 or any suitable component of server 102 or the EDCS 100 can execute the administrative tool 108.

The client 140 may be any computing device operable to connect to or communicate with at least the server 102 and provides functionality to measure strength of a unit test. In general, the client 140 comprises an electronic computing device operable to receive, transmit, process, and store any appropriate data associated with the EDCS 100, for example, the IIE 107, GUIs, utilities/tools such as the administration tool 108, and the like. More particularly, among other things, the client 140 can generate unit test requests to the server 102 associated with generating an immunity index for particular software source code, interpret unit test results returned from the server 102, and perform administrative functions related to the IIE 107. The client typically includes a processor 144, a client application 146, a memory 148, and/or an interface 149 interfacing over a system bus 141.

The client application 146 is any type of application that allows the client 140 to navigate to/from, request, view, create, edit, delete, administer, and/or manipulate content associated with the server 102. For example, the client application 146 can present GUI displays to a user generated by the IIE 107 and/or the administration tool 108, accept user input, and transmit the user input back to the server 102 for dissemination to the appropriate components of server 102. In some implementations, the client application 146 can be and/or include a web browser. In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a unit test execution/administration request to the server 102. Further, although illustrated as a single client application 146, the client application 146 may be implemented as multiple client applications in the client 140.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to send requests to the server 102 and to receive and process responses from the server 102.

The memory 148 typically stores objects and/or data associated with the purposes of the client 140 but may also be consistent with the above-described memory 106 of the server 102 or other memories within the EDCS 100 and be used to store data similar to that stored in the other memories of the EDCS 100 for purposes such as backup, caching, and the like.

Further, the illustrated client 140 includes a GUI 142 (illustrated as associated with client 140*a*) that interfaces with at least a portion of the EDCS 100 for any suitable purpose. For example, the GUI 142 may be used to view data associated with the client 140, the server 102, or any other component of the EDCS 100. In particular, in some implementations, the client application 146 may act as a GUI interface for the IIE 107, administration tool 108, and/or other components of server 102. For example, the GUI 142 can be used, in some implementations, to generate a unit test execution/administration request to transmit to the server 102.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140*a*-140*c*) is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142, as illustrated specifically with respect to the client 140a.

Note that in some implementations, a server 102 is not necessary for testing and that all testing can be performed locally on the client 140. For example, unit tests may be performed on non-compiled code, for example local JAVA code file code.js and tested with local JAVA test file test.js. If code.js is changed, test.js can be executed to check if the changes to code.js did not introduce errors. In other implementations, a server 102 can be useful where a software developer submits a code change a central repository, for example source code 120 on server 102. In these implementations, central tests executed on a server can be used to verify that the submitted code change did not introduce any errors. In other implementations, a hybrid of the implementations can be used. For example, some code changes can first be run locally and then submitted to a central repository when in a particular state to be verified by server-based central tests. Other variations will be apparent to those of skill in the art.

Figure 2:
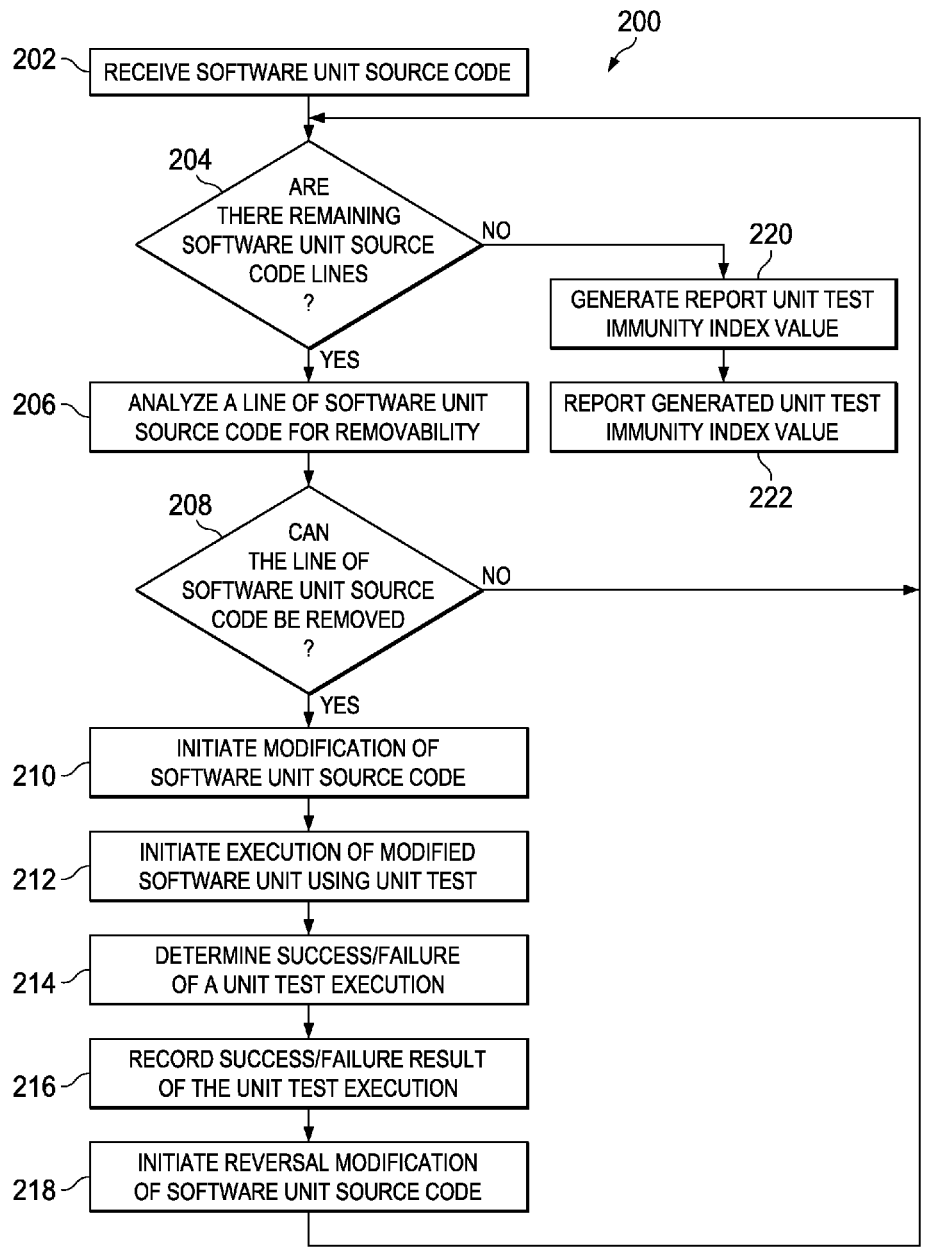
FIG. 2 is a flow chart illustrating a method for measuring strength of a unit test according to an implementation.

FIG. 2 is a flow chart illustrating a method for measuring strength of a unit test according to an implementation. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, or in any order.

At 202, source code for a software unit is received. In some implementations, the software unit source code is retrieved from one or more instances of source code in the memory of the server. In some implementations, the software unit source code is requested by the administration tool and/or the IIE. In some implementations, the administration tool and/or the IIE work in conjunction with a separate software test tool (not illustrated) to receive the software unit source code. In some implementations, the received software unit source code can be parsed to determine, for example, number of statements, statement types, programming language type, removability from the source code (as described above) or other appropriate value consistent with the purposes of this disclosure. In some implementations, the parsed data can be used in lieu of 206 below to increase efficiency. From 202, method 200 proceeds to 204.

At 204, a determination is made as to whether there are remaining software unit source code lines to analyze. For example, if the file is empty, the determination would be made that no source code lines exist. If it is determined that there are remaining software unit source code lines to analyze, method 200 proceeds to 206. If it is determined that there are no remaining software unit source code lines to analyze, method 200 proceeds to 220. At 220, a UTII value is generated. In some implementations, the UTII is calculated by the IIE or a component of the EDCS is instructed by the IIE to calculate the UTII for reporting. From 220, method 200 proceeds to 222.

At 222, the generated UTII value is reported. Typically the IIE reports the calculated UTII. From 222, method 200 stops.

At 206, a line of the software unit source code is analyzed, as described above, to determine if it can be removed. In some implementations, one or more instances of rules in the memory of the server are used in the analysis. From 206, method 200 proceeds to 208.

At 208, a determination is made whether the line of the software unit source code can be removed. If it is determined that the line of the software unit source code can be removed, method 200 proceeds to 210. If it is determined that the line of the software unit source code cannot be removed, the line is skipped and method 200 proceeds back to 204.

At 210, a modification of the software unit source code is initiated. In some implementations, a copy of the software unit source code is made leaving the original software unit source code unmodified. The line of software unit source code is removed from the software unit. From 210, method 200 proceeds to 212.

At 212, execution of the modified software unit source code is initiated using an associated unit test execution. From 212, method 200 proceeds to 214.

At 214, a success/failure of the unit test execution (executing the modified software unit source code) is determined. From 214, method 200 proceeds to 216.

At 216, the determined success/failure of the unit test execution (executing the modified software unit source code) is recorded. In some implementations, the determined success/failure is recorded in the memory of the server in one or more instances of results. From 216, method 200 proceeds to 218.

At 218, a reversal of the modification of the software unit source code is initiated. In implementations where a copy of the software unit source code was made, the copy can be discarded and a new copy of the original software unit source code can be retrieved. In some implementations, the copy of the software unit source code can have the removed line of source code restored. From 218, method 200 proceeds back to 204 to check the next line of the software unit source code.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving software unit source code associated with a unit test;
analyzing a line of the software unit source code to determine removability of the line of the software unit source code;
initiating, by operation of a computer, modification of the software unit source code to remove the line of the software unit source code and create a modified software unit;
initiating execution of the modified software unit using the unit test;
determining success or failure of a unit test execution; and
analyzing remaining lines of the software unit source code for removability;
generating a unit test immunity index value as a ratio of unit test execution failures to a number of lines of the software unit source code determined to be removable, wherein a failure of a unit test execution indicates that a removed line of software unit code is essential for proper testing of software unit source code; and
based on the generated unit test immunity index, performing additional testing of particular logic associated with one or more lines of software unit source code that caused a failure of a unit test execution when removed from the software unit source code.

2. The method of claim 1, further comprising determining whether there are remaining lines of software unit source code for analysis.

3. The method of claim 1, further comprising determining whether the line of the software unit source code can be removed.

4. The method of claim 1, further comprising modifying the software unit source code to remove the line of the software unit source code.

5. The method of claim 1, further comprising recording the determined success or failure of the unit test execution.

6. The method of claim 1, further comprising initiating reversal of the modification of the software unit source code.

7. A non-transitory, computer-readable medium storing computer-readable instructions executable by a computer and operable to:
receive software unit source code associated with a unit test;
analyze a line of the software unit source code to determine removability of the line of the software unit source code;
initiate modification of the software unit source code to remove the line of the software unit source code and create a modified software unit;
initiate execution of the modified software unit using the unit test;
determine success or failure of a unit test execution; and
analyze remaining lines of the software unit source code for removability;
generate a unit test immunity index value as a ratio of unit test execution failures to a number of lines of the software unit source code determined to be removable, wherein a failure of a unit test execution indicates that a removed line of software unit code is essential for proper testing of software unit source code; and
based on the generated unit test immunity index, perform additional testing of particular logic associated with one or more lines of software unit source code that caused a failure of a unit test execution when removed from the software unit source code.

8. The medium of claim 7, further operable to determine whether there are remaining lines of software unit source code for analysis.

9. The medium of claim 7, further operable to determine whether the line of the software unit source code can be removed.

10. The medium of claim 7, further operable to modify the software unit source code to remove the line of the software unit source code.

11. The medium of claim 7, further operable to record the determined success or failure of the unit test execution.

12. The medium of claim 7, further operable to initiate reversal of the modification of the software unit source code.

13. A system, comprising:
   a memory configured to contain software unit source code;
   at least one computer interoperably coupled with the memory and configured to:
      receive software unit source code associated with a unit test;
      analyze a line of the software unit source code to determine removability of the line of the software unit source code;
      initiate modification of the software unit source code to remove the line of the software unit source code and create a modified software unit;
      initiate execution of the modified software unit using the unit test;
      determine success or failure of a unit test execution; and
      analyze remaining lines of the software unit source code for removability;
   generate a unit test immunity index value as a ratio of unit test execution failures to a number of lines of the software unit source code determined to be removable, wherein a failure of a unit test execution indicates that a removed line of software unit code is essential for proper testing of software unit source code; and
   based on the generated unit test immunity index, perform additional testing of particular logic associated with one or more lines of software unit source code that caused a failure of a unit test execution when removed from the software unit source code.

14. The system of claim 13, further configured to determine whether there are remaining lines of software unit source code for analysis.

15. The system of claim 13, further configured to determine whether the line of the software unit source code can be removed.

16. The system of claim 13, further configured to modify the software unit source code to remove the line of the software unit source code.

17. The system of claim 13, further configured to record the determined success or failure of the unit test execution.

18. The system of claim 13, further configured to initiate reversal of the modification of the software unit source code.

* * * * *